United States Patent [19]

Dolasia

[11] Patent Number: 5,106,177
[45] Date of Patent: Apr. 21, 1992

[54] SURVEILLANCE SAFETY MIRROR

[76] Inventor: Devendra P. Dolasia, 4 Tanworth Close, Northwood, Middlesex, United Kingdom, HA6 2GF

[21] Appl. No.: 544,320

[22] Filed: Oct. 9, 1990

[30] Foreign Application Priority Data

Jan. 24, 1990 [GB] United Kingdom ............... 9001646

[51] Int. Cl.$^5$ ............................................. G02B 7/18
[52] U.S. Cl. ................................. 359/876; 248/478; 359/872
[58] Field of Search ............... 350/631, 632, 634, 636, 350/638, 639; 248/468, 476, 478, 483, 484

[56] References Cited

U.S. PATENT DOCUMENTS

| | | | |
|---|---|---|---|
| 4,125,244 | 11/1978 | Lukey | 248/478 |
| 4,349,246 | 9/1982 | Binner | 350/638 |
| 4,890,908 | 1/1990 | Casey | 350/634 |
| 4,906,088 | 3/1990 | Casey | 350/632 |
| 4,941,638 | 7/1990 | Di Salvatore | 350/632 |

Primary Examiner—Rodney B. Bovernick
Assistant Examiner—J. P. Ryan

[57] ABSTRACT

An object of the present invention is to provide an easily removable and storable surveillance driving mirror for the aforesaid purpose, and wherein the vibration due to vehicles motion is substantially eliminated. My surveillance safety mirror design includes a heavy duty vinyl tape backed convex mirror (horizontal plain only), rubber pads on the tip of the spring-loaded clamp, threaded collar, off-set (off center) ball/socket housing, pivotal ball arm and a spring-loaded edge bordered clamp. My design is more versatile in function, by the very nature of the spring-loaded clamp, pivotal ball arm, threaded collar and off-center ball socket housing. It can be attached to any suitable point in the vehicle, the most ideal/suitable point being on the vehicle's existing rear-view mirror's day/night selector switch. This provides for conventional monitoring, without distracting or obstructing the view of the user.

3 Claims, 1 Drawing Sheet

000
SURVEILLANCE SAFETY MIRROR

FIELD OF INVENTION

My invention relates to a surveillance safety mirror for removable attachment to an existing mirror or sun/shade visor, in a vehicle whereby the driver or a passenger may view the occupant of a rear seat of the vehicle. The device is particularly useful for enabling an unaccompanied driver to view an infant/child travelling in the rear seat, whilst maintaining an uninterrupted view of the following traffic through vehicle's rear-view mirror/rear window.

DESCRIPTION OF THE PRIOR ARTS

Numerous secondary stick-on rear view mirrors, utilizing rubber suction cup attachment principal are in production. These are specifically designed to affix on to a clean and smooth surface, such as an automobile windshield. While such designs provide large and firm attachment points, they are by the very nature of their design restrictive in their function, i.e., due to the wide sweep of the modern automobile windshields, the angular movement of the suction type mirrors is restricted, in addition to this, changes in the weather and temperature conditions, causes the rubber suction cups to loose their grip and this results in the mirror falling off. I am not aware of any previous patent application filing which is comparative to my design.

SUMMARY OF THE INVENTION

An object of the present invention is to provide an easily removable and storable surveillance driving mirror for the aforesaid purpose, and wherein the vibration due to vehicles motion is substantially eliminated. My surveillance safety mirror design includes a heavy duty vinyl tape backed convex mirror (horizontal plain only), rubber pads on the tip of the spring-loaded clamp, threaded collar, off-set (off center) ball/socket housing, pivotal ball arm and a spring-loaded edge bordered clamp. My design is more versatile in function, by the very nature of the spring-loaded clamp, pivotal ball arm, threaded collar and off-center ball socket housing. It can be attached to any suitable point in the vehicle, the most ideal/suitable point being on the vehicle's existing rear-view mirror's day/night selector switch. This provides for conventional monitoring, without distracting or obstructing the view of the user.

DESCRIPTION OF THE PREFERRED EMBODIMENTS

Figure 3:
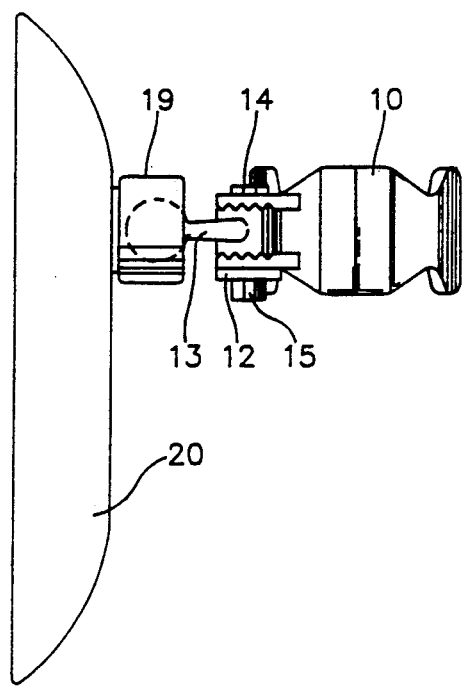
FIG. 3: is a plan view thereof.
Figure 1:
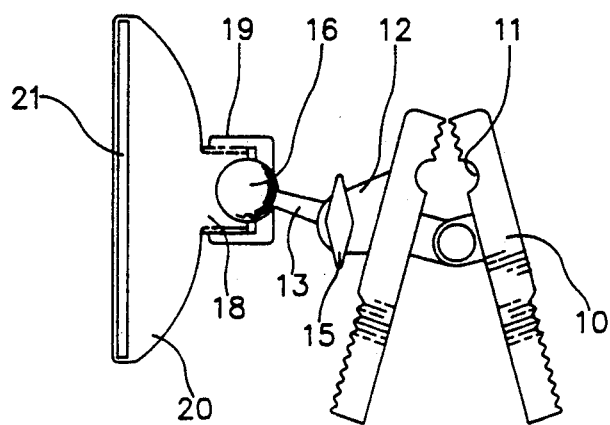
FIG. 1: is a side elevation of the surveillance safety mirror made in accordance with the invention.
Figure 2:
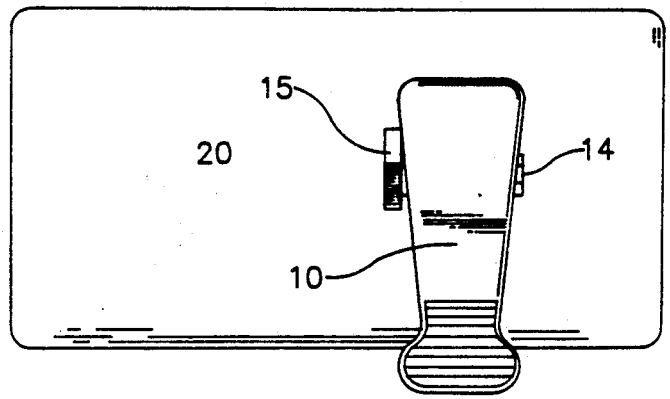
FIG. 2: is a rear view thereof.

An embodiment of the invention will now be described, by the way of example, with reference to above-mentioned drawings. The mirror which is intended to be connected to an existing rear-view mirror of a vehicle comprises of a spring loaded clamp 10, the jaws of which incorporate rubber pads which are ribbed to receive and firmly grip the edge of the sun/shade visor (or any suitable point), or the existing rear-view mirror's day/night selector switch. Attached to one face of the clamp 10, is a pair of spaced arms 12, between which is pivotally connected an arm 13 such that the latter may pivot about a horizontal axis. A clamping screw 15 which passes through arm 12 and arm 13 to a nut 14 is provided to tighten the pivoted position of arm 13.

At the free end of arm 13 is a ball 16 forming one part of a ball and socket connector. In this example, the socket 18 and the threaded collar 19 form part of a housing 20 in which is located a heavy duty vinyl backed convex mirror (not visible in the drawings).

At each end of housing 20 is a slot 21 through which may pass a sheet of shading film or paper to reduce or eliminate the reflective qualities of the mirror. Thus, when the mirror is not in use, a non-reflective sheet may be inserted through one or other slots 21. Shading material may be used instead to prevent glare, for example, for night driving. It will be seen that the device may be readily attached to the vehicle's existing rear-view mirror's day/night selector switch or the sun/shade visor, and may be adjusted to provide the driver with a view of the rear seat area, or alternatively to provide the front seat passenger with a view of the following traffic. In the latter case, the device may be used by driving instructor travelling in the front passenger seat. The mating surfaces of arms 12 and 13 have a ribbed formation such that pivotal adjustment is incremental rather than infinitely variable. This will assist the clamping screw 15 in ensuring that the arm 13 cannot "sink" due to motion of the vehicle.

It is not intended to limit the invention to the above example only. For example, the device may be used at an angle of 90 degrees to the position illustrated in the drawings so that the clamp 10 is attached to the end of the existing driving mirror, and owing to the ball joint, the housing 20 may be rotated to any angle or position as required.

Further, the pivotal connection of the arms 12 and 13 may be by a further ball and socket connector. Yet again, the ball and socket connection may be provided between arms 12 and 13 whilst the free end of the arm 13 may be connected to the housing 20 by a single axial pivot. Preferably, the entire device, or at least a substantial part thereof is made from rigid plastics material such as polypropylene although as an alternative, the material may be light metallic alloy.

I claim:
1. A surveillance safety mirror comprising:
(A) a spring-loaded clamp, with spaced arms incorporating ridges;
(B) a ball-arm, incorporating ridges at the mating point to the aforementioned spring-loaded clamp's spaced arms, wherein attachment of the ball-arm to the spring-loaded clamp by means of a clamping screw, permits the ball arm to pivot about a horizontal axis, and is adjustable and the said clamping screw may be tightened to prevent the ball arm from sinking;
(C) a threaded collar, which connects the aforementioned ball-arm to the socket section located on the mirror frame, and which may be tightened upon adjusting the mirror frame to the desired position to ensure that its adjusted and desired position is maintained, even upon removal or stowage;
(D) a ball and socket housing, positioned off-center on the mirror frame, thus permitting rotation of mirror frame through an angle of 360 degrees in order to increase or obtain the field of vision of the side desired.

2. The surveillance safety mirror of claim 1, said spring-loaded clamp comprising of:
(A) ribbed, rubber tipped jaws;
(B) spaced arms incorporating ridges;
(C) clamping screw, to secure desired pivotal position of aforementioned ball-arm; and
(D) bordered edge area.

3. The surveillance safety mirror of claim 2, said spaced arms having ridges on sides facing each other, such that only incremental rather than infinite pivotal adjustments of the aforementioned ball-arm is allowed.

* * * * *